United States Patent [19]

Himeno

[11] Patent Number: 4,581,200
[45] Date of Patent: Apr. 8, 1986

[54] METHOD AND APPARATUS FOR REMOVING HYDROGEN FROM SECONDARY COOLING SYSTEMS OF FAST BREEDER REACTORS

[75] Inventor: Yoshiaki Himeno, Mito, Japan

[73] Assignee: Doryokuro Kakunenryo Kaihatsu Jigyodan, Tokyo, Japan

[21] Appl. No.: 416,598

[22] Filed: Sep. 10, 1982

[30] Foreign Application Priority Data

Sep. 11, 1981 [JP] Japan .................. 56-143541

[51] Int. Cl.[4] .............................. G21C 19/32
[52] U.S. Cl. .................. 376/310; 252/631; 376/312
[58] Field of Search ............ 423/646, 648 R; 376/310, 312; 252/631

[56] References Cited

U.S. PATENT DOCUMENTS

| | | | |
|---|---|---|---|
| 1,796,265 | 3/1931 | Freudenberg et al. | 423/646 |
| 2,372,671 | 4/1945 | Hansley | 423/646 |
| 2,884,311 | 4/1959 | Huff | 423/646 |
| 2,946,662 | 7/1960 | Mosely | 423/646 |
| 3,243,280 | 3/1966 | Bohlmann et al. | 376/310 |
| 3,495,938 | 2/1970 | Cooper | 423/646 |
| 3,622,303 | 11/1971 | Hill | 376/310 |
| 4,075,060 | 2/1978 | Colburn | 252/631 |

FOREIGN PATENT DOCUMENTS

| | | | |
|---|---|---|---|
| 2852987 | 6/1979 | Fed. Rep. of Germany | 376/312 |
| 51-2048 | 1/1976 | Japan | 376/312 |
| 51-930 | 1/1976 | Japan | 376/312 |
| 51-37399 | 3/1976 | Japan | |
| 53-24006 | 7/1978 | Japan | 376/312 |
| 283089 | 1/1928 | United Kingdom | 423/646 |

OTHER PUBLICATIONS

Kirk-Othmer, *Encyclopedia of Chemical Technology*, vol. 12, Third Edition (1979), John Wiley & Sons, pp. 772-774.

Holmes, et al., "Sodium Purification by Cold Trapping at the Experimental Breeder Reactor II", *Nuclear Technology*, vol. 32 (Mar. 1977), pp. 304-314.

*Primary Examiner*—John Doll
*Assistant Examiner*—Wayne A. Langel
*Attorney, Agent, or Firm*—Fleit, Jacobson, Cohn & Price

[57] ABSTRACT

Removal of hydrogen impurities from a secondary cooling system of a liquid sodium cooled, fast breeder reactor is accomplished by providing a hydrogen-removing container, which may be a tank, in the secondary cooling system. The container has a sodium coolant inlet and outlet means, a gas phase zone statically containing a cover gas therein, and a cover gas inlet and outlet means. Sodium mist is deposited on the inner surface of the gas phase zone which faces the cover gas and functions as a hydrogen-getter means. Thus, the sodium mist deposit captures and accumulates hydrogen previously accumulated in the cover gas. By intermittently heating the inner surface of the container, the hydrogen captured by the sodium mist deposit is released into the cover gas. The hydrogen-containing cover gas is then discharged from the system and fresh cover gas is contemporaneously introduced and may be obtained by refining the hydrogen-containing cover gas to render it fresh and reusable. Conventional components constituting the secondary cooling system, such as, an intermediate heat exchanger, a steam generator, a secondary cold trap, or a sodium pump, may include a hydrogen-removing container integral thereto if a gas phase zone is provided in at least one of these components.

13 Claims, 3 Drawing Figures

METHOD AND APPARATUS FOR REMOVING HYDROGEN FROM SECONDARY COOLING SYSTEMS OF FAST BREEDER REACTORS

BACKGROUND OF THE INVENTION

This invention relates to the removal of hydrogen, a main impurity in a secondary cooling system of a liquid sodium cooled fast breeder reactor, from the system through a cover gas phase, to thereby prolong the life of a secondary cold trap.

The secondary cooling system of a fast breeder reactor is provided therein with a steam generator, in which heat exchange is carried out between a liquid sodium coolant and water via a wall of a heat-transfer tube to generate steam. It is known from past experience in operating a fast breeder that an extremely small part of the steam thus generated in the steam generator is decomposed, and that hydrogen, a product of the decomposition of the steam is, diffused, to passes through the wall of the heat-transfer tube in the steam generator, and enters the sodium in the secondary system. The hydrogen, thus diffused to and entered into the sodium in the secondary system, accounts for the greater part of the impurities therein. Consequently, the greater part of the impurities collected in a secondary cold trap, a refiner for sodium in the secondary system, consists of hydrogen. According to the results of rough calculations of a diffusion rate of hydrogen on the basis of the data collected on the experiments conducted heretofore, it can be predicted that, when several years have passed after starting an operation of a fast breeder reactor, the secondary cold trap is plugged with hydride, and its sodium-refining capability is lost.

According to conventional techniques, the cold trap thus plugged with the collected impurities, is replaced by a new cold trap. Although the replacement of such an impurity-plugged cold trap permits recovering the sodium-refining capability of the cold trap system, it is accomplished by the difficult work of cutting the secondary sodium pipes. In addition, with the existing state of knowledge of cold traps, it is almost impossible to accurately predict the life of the cold trap. Hence, in view of the possibility that the cold trap, in use, is plugged sooner or later, it is necessary to manufacture a spare cold trap in advance.

Thermally regenerating an impurity-plugged cold trap, instead of replacing the same, has been proposed in recent years. According to this method, an impurity-plugged cold trap is made vacuous, the cold trap is heated to increase the temperature thereof to thereby thermally decompose the collected hydrogen impurities therein, and the decomposed hydrogen impurities are vacuum-discharged out of the system. This method does not accompany an operation cutting of the sodium pipes, which is required in the above-described replacement of an impurity-plugged cold trap. Accordingly this thermally regenerating method can be practiced easily, and permits achieving a predetermined object is a comparatively short period of time. However, it takes at least several weeks to completely regenerate a cold trap by this thermal method. In view of the corrosion of a filler material in the trap with sodium, this thermal method cannot be practiced frequently.

SUMMARY OF THE INVENTION

Therefore, an object of the present invention is to provide a method, which permits removing hydrogen easily and effectively from a secondary cooling system of liquid sodium cooled fast breeder reactors.

Another object of the present invention is to provide a method, which permits preventing a secondary cold trap in a fast breeder from being plugged with hydrogen impurities, and thereby prolonging the life thereof.

Still another object of the present invention is to provide a method of prolonging the life of a secondary cold trap in a fast breeder reactor without replacing or regenerating the same when it is plugged with hydrogen impurities.

A space or gas phase zone in a component or apparatus, such as a tank in a secondary cooling system of a fast breeder reactor functions as a hydrogen-removing container and is filled with a cover gas, such as argon, and sodium mist is generated from vapor evaporated from the circulating liquid sodium coolant and is deposited; after on on an inner surface of the gas phase zone, which may be a wall of the component, which is in contact with the cover gas phase to constantly form a thin layer of the deposit thereon. The inventor of the present invention has found that this sodium mist deposit has the property of easily absorbing the hydrogen in the cover gas. Namely, the liquid drops of sodium absorb the ambient hydrogen gas to easily produce sodium hydride. Such a property of the deposit of sodium mist indicates that the deposit can be utilized as an absorbent, i.e., a "getter", for the hydrogen gas in the cover gas.

The present invention has been achieved by utilizing the hydrogen-gettering action of the sodium mist deposit formed on the wall surface of a component in the secondary cooling system which is in contact with a cover gas contained therein.

According to the present invention, the removal of hydrogen impurities from a secondary cooling system of liquid sodium cooled fast breeder reactor is accomplished by providing a hydrogen-removing tank in the secondary cooling system. The hydrogen-removing tank has an inlet and an outlet of the liquid sodium and a cover gas phase therein. On the inner surface of such tank which faces the cover gas phase, a sodium mist deposit is formed. Hydrogen gas contained in the cover gas is captured by the sodium mist deposit due to its hydrogen-getter property.

In order to release the hydrogen thus captured by the sodium mist deposit into the cover gas phase, the inner surface of the tank may intermittently be heated. The hydrogen which has been released into the cover gas phase can be sent away to the outside of the secondary cooling system by replacing the hydrogen-containing cover gas with a fresh cover gas or refining the hydrogen-containing cover gas using a suitable refining means and reusing it.

A secondary cooling system for a fast breeder reactor is generally constituted of an intermediate heat exchanger, a steam generator, a secondary cold trap, a secondary mechanical sodium pump and the like, and secondary sodium pipes interconnecting these components to thereby put them in fluid communication with one another. If a cover gas phase zone is provided in at least one of these components, the method according to the present invention may be carried out by heating the inner surface of the gas phase zone, i.e., the wall, of any one of these components, without additionally providing the above-mentioned hydrogen-removing tank in the secondary cooling system.

The above and other objects as well as advantageous features of the invention will become apparent from the following description of the preferred embodiment taken in conjunction with the accompanying drawings.

DESCRIPTION OF THE PREFERRED EMBODIMENT

Figure 1:
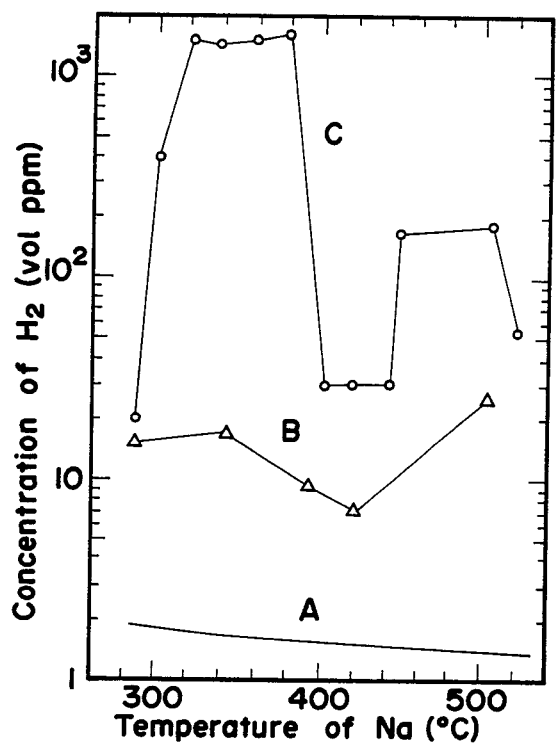
FIG. 1 is a graph showing the concentration of hydrogen gas in a cover gas.

FIG. 1 shows the results of an experiment conducted for measuring the concentration of hydrogen gas in a cover gas (argon gas) statically contained in a tank provided in a loop system in a sodium loop having a cold trap (the temperature of a stainless steel mesh inserted in this cold trap is maintained at 150° C.). As may be understood from the graph in FIG. 1, the actual concentration (curve B) of hydrogen in a cover gas is at least not less than ten times as high as a theoretical value (curve A) of concentration of hydrogen in a cover gas, which is in equilibrium with a partial pressure of hydrogen in the sodium in the loop, when the temperature of the sodium is in the range of about 300°–500° C. Although the cause of this phenomenon is unknown, an unexpectedly high concentration of hydrogen exists in the cover gas phase in a component in the secondary cooling system. As is well-known, a sodium mist deposit is accumulated constantly to a small thickness on that surface of a wall of a component which is in contact with the cover gas phase.

As hereinbefore described, the sodium mist deposit has the property of easily absorbing the hydrogen in a cover gas. Therefore, during a normal operation of the fast breeder reactor, hydrogen is concentrated gradually. Namely, the hydrogen is concentrated by accumulation more in the cover gas than in the sodium placed in the system, and more in the deposit of sodium mist than in the cover gas, due to the above-mentioned property of the same deposit.

It was ascertained by experiments that, when the sodium hydride thus concentrated in the deposit of sodium mist is heated, it is decomposed easily to release hydrogen therefrom. A curve C in FIG. 1 shows this fact. In other words, curve C shows that, when such sodium hydride is heated, the concentration of hydrogen in the cover gas becomes extremely high. During the above experiment, the temperature of the wall of the tank, which was normally kept at 150° C., was increased rapidly to about 350° C. to measure the concentration of hydrogen in the cover gas. The surface area of that portion of the tank which was in contact with the cover gas was about 1.7 m$^2$, and the thickness of sodium mist deposited on this portion of the surface of the tank was about 1 mm. Therefore, the amount of sodium in the sodium mist, which was calculated on the assumption that the apparent specific density of the deposit is 0.3 g/cm$^3$, was about 500 g.

The temperature, to which the sodium mist deposit is heated, i.e., the temperature to which the inner wall of a component on which sodium mist is deposited is heated, will now be described hereinbelow. A hydride normally starts being decomposed at about 250° C., but, in practice, it is heated at not less than about 300° C. There is not an upper limit temperature in particular, at which a hydride is heated to be decomposed, but about 500° C. is a practical upper limit temperature. Even when the temperature of the wall surface during a normal operation of the fast breeder reactor is as high as not less than 300° C., the method according to the present invention can be applied by increasing such a temperature by not less than about 100° C.

Thus, according to the present invention, the hydrogen condensed in the sodium mist deposit on that surface of a wall member which is in contact with a cover gas phase in a component in a secondary cooling system is released into the cover gas by heating the deposit of sodium mist to a temperature not lower than the decomposition temperature of the hydride therein for a short period of time at regular time intervals of, for example, one month, and the resulting cover gas is replaced with a cover gas not containing any hydrogen impurities, i.e., a fresh cover gas to immediately send away from the system the hydrogen contained in the old cover gas. Such operations are repeated intermittently during the operation of a fast breeder reactor to intermittently send away the hydrogen from the secondary cooling system, and thereby reduce the burden of collecting hydrogen impurities from the secondary cold trap. This allows the life of the cold trap to be prolonged.

A secondary cooling system for a fast breeder reactor is generally constituted of an intermediate heat exchanger, a steam generator, a secondary cold trap, a secondary mechanical sodium pump and the like, and secondary sodium pipes interconnecting these components. If a cover gas phase zone is provided in these components, the method according to the present invention may be practiced by heating the inner surface of the zone, i.e., the wall, of any one of these components.

The method according to the present invention may also be practiced preferably by heating the surface of a wall of a tank which is used only for removing hydrogen from the sodium coolant and is provided additionally in the secondary system. A hydrogen-removing tank 11 shown in FIG. 2 has a cover gas phase 12 in an upper portion thereof. Sodium 13 used as a coolant is introduced into the interior of the tank 11 through an inlet 22 to stay therein for a predetermined period of time, and then circulated out therefrom through an outlet 23. A heater (not shown) is buried in the wall of the tank 11, so that the temperature of the wall can be increased to not less than about 300° C. The tank 11 is further provided with an inlet port 14 and an outlet port 15 for cover gas so as to permit the replacement of cover gas to be carried out while the surface of the wall thereof is heated. This hydrogen-removing tank 11 may be provided in any part of a secondary cooling loop to obtain the desired effect, but it is most preferably provided in the position shown in FIG. 2, which is on the upstream side of a cold trap 16, and on the downstream side of a steam generator 17. The reason why this position is most preferable is that, since the steam generator 17 is the source of generated hydrogen, which is mixed in the sodium in the secondary system as mentioned previously, the concentration of hydrogen impurities becomes high on the downstream side thereof. Reference numeral 18 denotes an intermediate heat exchanger, and 19 a secondary pump. While the fast breeder reactor is in normal operation, the hydrogen gas released from the sodium into the cover gas phase is absorbed in the sodium mist deposit naturally formed on that portion of the inner surface of the tank 11 which faces the cover gas phase 12. The heater buried in the wall of the tank 11 is operated periodically, for example, at an approximate rate of once a month to heat the wall of the tank to about not less than 300° C., and release the hydrogen gas, which has been absorbed in the deposit of sodium mist, into the cover gas. At the same time, i.e., contemporaneously, a cover gas not containing impurities is introduced into the inlet port 14 to immediately send away the released hydrogen gas with the cover gas from the outlet port 15. Such operations are repeated intermittently to discharge the hydrogen contained in the sodium in the secondary cooling system to outside the system and thereby prolong the life of the cold trap.

In place of the above-described cover gas-replacing method, there may be employed a method for refining the cover gas, in which, after the hydrogen has been released into the cover gas phase by heating, the hydrogen-containing cover gas is led into a suitable refining means such as, for example, a platinum-palladium catalytic column, a hydrogen-absorbing agent of hydridable metal and the like, and the thus refined cover gas is reused in the cover gas phase in the tank.

In order to send away from the system the hydrogen released into the cover gas, a method of vacuum sucking a hydrogen-containing cover gas may also be thought of. However, when the interior of a component in the system is evacuated, the outer air would be sucked therein. Therefore, the vacuum suction method cannot be employed in the present invention.

Figure 3:
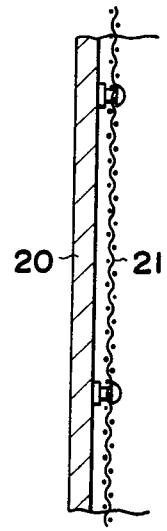
FIG. 3 is a sectional view of a reticulated structure attached to an inner surface of a wall member according to this invention.
Figure 2:
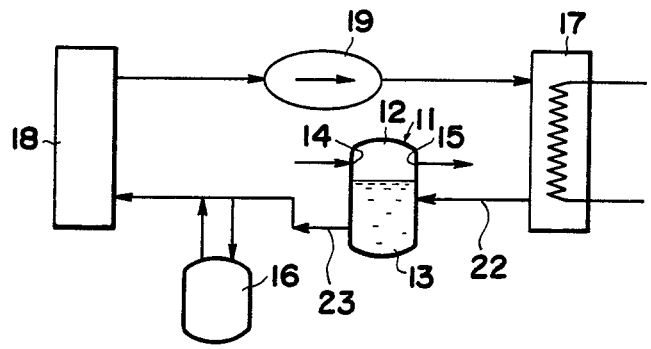
FIG. 2 illustrates an embodiment of the present invention.

As stated previously, the present invention utilizes as a hydrogen-getter the sodium mist deposit on a wall member contacting a cover gas, so that the amount of hydrogen collected increases in proportion to the amount of the deposit of sodium mist. Accordingly, in order to increase the amount of deposit of sodium mist, it is preferable that the surface area of the wall member contacting the cover gas be increased. Methods for increasing the surface area of such a wall member include, for example, a method of providing the inner wall of the component in the secondary cooling system with a wavy surface or a method of pleating the inner surface of such a wall. Also, as shown in FIG. 3, there is a method of attaching to the inner surface of such a wall 20 a reticulate structure 21 consisting of a material having a high heat transfer rate, such as stainless steel. Such a reticulate structure can be installed reasonably in a hydrogen-removing tank 11 as shown in FIG. 2.

Since the present invention is directed to a method of removing hydrogen from a secondary cooling system for a fast breeder reactor constructed as described above, it permits discharging a considerable amount of hydrogen from the system extremely easily in a short period of time. Moreover, the method can be practiced without hindering the operation of the breeder at all, and permits prolonging the life of the secondary cold trap. Therefore, the present invention can be carried out most effectively as a method capable of settling at once various problems concerning a cold trap, which is, according to a conventional technique, plugged with hydrogen impurities frequently, and which is, according to a conventional technique, not treated excellently when it is plugged with such impurities.

The present invention is not, of course, limited to the above embodiments; it may be modified in various ways within the scope of the appended claims.

What is claimed is:

1. In a secondary cooling system for a liquid sodium cooled, fast breeder reactor having components including an intermediate heat exchanger, a steam generator, a secondary cold trap, and a liquid sodium pump in fluid communication with one another by means of a fluid communication means and thereby enabling liquid sodium coolant to be circulated therethrough, an apparatus for removing hydrogen generated in use and collected by the liquid sodium coolant, the apparatus comprising:

a. a hydrogen-removing container in fluid communication with the circulating liquid sodium coolant and having a liquid sodium coolant inlet and outlet means, a gas phase zone capable of statically containing in use a cover gas which receives and accumulates hydrogen gas which is released from the liquid sodium coolant circulating through said container, and a cover gas inlet and outlet means for putting the gas phase zone in fluid communication with a source of fresh cover gas, wherein the gas phase zone further comprises an inner surface adapted to receive in use a hydrogen-getter means consisting essentially of a sodium mist deposit formed by the condensation of evaporated sodium thereon, which deposit is in contact with the cover gas in use and functions to accumulate hydrogen as sodium hydride; and b. a means for intermittently heating the inner surface of said container to thereby intermittently release in use the hydrogen captured by the hydrogen-getter means into the cover gas of the gas phase zone, from which zone, the hydrogen-cotaining cover gas may be discharged through the cover gas outlet means.

2. An apparatus according to claim 1, wherein the hydrogen-removing container is included in at least one component of the secondary cooling system selected from the group consisting of an intermediate heat exchanger, a steam generator, a secondary cold trap, and a liquid sodium pump.

3. An apparatus according to claim 1, wherein the hydrogen-removing container is a tank which is included in the secondary cooling system and is in fluid communication with the other components thereof.

4. An apparatus according to claim 3, wherein the tank is disposed between the steam generator and the secondary cold trap of the secondary cooling system and upstream of the cold trap.

5. An apparatus according to claim 1, wherein the apparatus further comprises a means for intermittently replacing in use the hydrogen-containing cover gas in the gas phase zone of the container by discharging the gas through the cover gas outlet means and contemporaneously introducing fresh cover gas through the cover gas inlet means.

6. An apparatus according to claim 5, wherein the means for intermittently replacing in use the hydrogen-containing cover gas further comprises a means for refining the discharged hydrogen-containing cover gas to remove hydrogen therefrom and render the refined cover gas suitable for reuse and introduction into the gas phase zone through the cover gas inlet means.

7. An apparatus according to claim 6, wherein the means for refining the hydrogen-containing cover gas comprises a platinum-palladium catalytic column.

8. An apparatus according to claim 1, wherein the inner surface of the gas phase zone further comprises a reticulated structure comprised of a material having a high heat transfer rate to thereby increase the surface area thereof available for receiving in use the hydrogen-getter means.

9. A method for removing hydrogen impurities which collect in a liquid sodium coolant of a secondary cooling system for a liquid sodium cooled, fast breeder reactor, comprising:
   a. capturing hydrogen gas released from the liquid sodium coolant circulating through a gas phase zone of a hydrogen-removing container in a cover gas statically contained in the gas phase zone to thereby accumulate hydrogen therein;
   b. contacting the hydrogen-containing cover gas with a hydrogen-getter means consisting essentially of a sodium mist deposit formed by the condensation of evaporated sodium onto an inner surface of the gas phase zone to thereby accumulate hydrogen as sodium hydride therein;
   c. intermittently heating the inner surface of the gas phase zone to a temperature of at least about 250° C. to decompose the hydride and thereby release the hydrogen accumulated in the hydrogen-getter means into the cover gas; and
   d. discharging the hydrogen-containing cover gas from the gas phase zone through a cover gas outlet means and contemporaneously replacing the discharged cover gas by introducing a fresh cover gas through a cover gas inlet means.

10. A method according to claim 9, wherein the method further comprises the step of refining the discharged hydrogen-containing cover gas to remove hydrogen therefrom and to render the refined cover gas fresh and suitable for reuse, and introducing the refined cover gas into the gas phase zone through the cover gas inlet means.

11. A method according to claim 9, wherein the step of contacting the hydrogen-containing cover gas with the hydrogen-getter means is facilitated by providing the inner surface of the gas phase zone with a reticulated structure comprised of a material having a high heat transfer rate to thereby increase the surface thereof available for condensation thereon of the sodium mist deposit.

12. A method according to claim 9, wherein the step of intermittently heating the inner surface of the gas phase zone further comprises heating the inner surface to a temperature from about 300° C. to about 500° C.

13. A method according to claim 9, wherein the step of capturing hydrogen gas released from the liquid sodium coolant circulating through a gas phase zone of a hydrogen-removing container in a cover gas statically contained therein is accomplished by providing argon as the cover gas.

* * * * *